Patented Mar. 20, 1923.

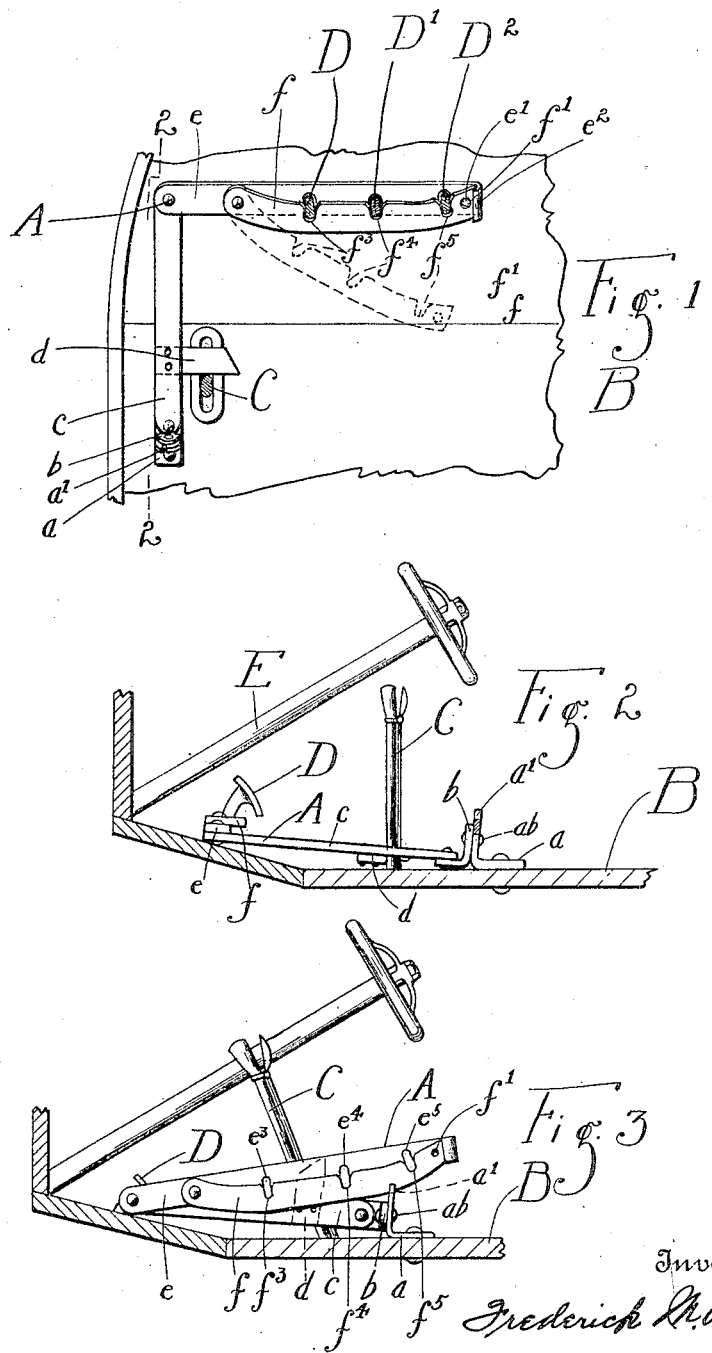

1,448,945

UNITED STATES PATENT OFFICE.

FREDERICK M. ROSS, OF CINCINNATI, OHIO.

AUTOMOBILE LOCK.

Application filed January 21, 1920. Serial No. 353,001.

*To all whom it may concern:*

Be it known that I, FREDERICK M. ROSS, a citizen of the United States of America, and a resident of Cincinnati, in the county of Hamilton and State of Ohio, have invented a new and useful Improvement in Automobile Locks, of which the following is a specification.

The object of my invention is to provide a locking device that will have a maximum of effect as a lock, that can be easily, readily and quickly applied and released, that is securely attached to the body of the automobile and can be neatly positioned adjoining the area of operation, while not in use, without inconveniencing the operator, and not being in his way or detrimental to the operation of the automobile.

These objects are attained by the means described in the specification and illustrated in the accompanying drawing in which:—

Fig. 1, is a fragmental plan view of an automobile, showing my invention in mounted relation thereto.

Fig. 2, is a sectional view on line 2—2 of Fig. 1, the device being operative.

Fig. 3, is a view similar to Fig. 2, the device being inoperative.

My device comprises a series of links, one of which is securely attached to the bottom of an automobile, in such relation to one another that two links, operative as jaws, close upon the foot pedals while a lug, from one of the other links, secures the hand levers, the whole series of links being so connected that, when inoperative, they can be folded and retained at the outer edge of the automobile floor.

The combined automobile pedal and hand lever locking device A comprises the bracket $a$, securely attached to the floor or bed B of the automobile. An angle link $b$ is pivotally connected to bracket $a$ and to one end of arm $c$. On its other end arm $c$ is pivotally connected with finger $e$. The lug $d$ is attached to arm $c$ at such a place that it will prevent the lever C being operated, thereby binding the emergency brake when the locking device is in an operative position. A link $f$ is pivotally attached to finger $e$ in such a manner and position that an aperture $f'$ in the link $f$ will coincide with the aperature $e'$ in the finger $e$, permitting the shackle of a padlock being passed thru both members and locking them together. The free end of finger $e$ is turned upon itself forming a covered seat $e^2$ for the free end of link $f$, and preventing its being raised when locked. At certain determinable places on the finger $e$, are formed notches or seats $e^3$, $e^4$ and $e^5$ adapted to engage the shanks of the foot pedals D', D². A series of notches or seats $f^3$, $f^4$ and $f^5$ in link $f$ register with notches $e^3$, $e^4$, and $e^5$ respectively, and form the complements to the aperatures formed when $e$ and $f$ are in lengthwise contact, thereby firmly engaging and preventing any backward or forward movement of the shanks D. The angle link $b$ and the arm $c$ can be made as a single element with a shoulder formed on its end, but in view of the fact that in many of the models of the same make of automobiles there is a variation in the distances between the emergency brake lever and the pedals, it has been found advisable to construct the device with this angle link. A notch $a'$ in the top of bracket $a$ serves as a seat for the link $f$ when the device is inoperative. E is the steering post.

The operation of the device is as follows:—

Bracket $a$ is securely attached to the bed of the automobile. When it is desired to lock the machine, the hand lever C is drawn back so as to engage the brake, the link is disengaged from the seat $a'$, finger $e$ and link $f$ are moved away from the bracket $a$, at the same time the arm $c$ and angle link $b$ are turned on pivot $ab$, connecting bracket $a$ and link $b$, so that the finger will pass under the steering post and lodge the lug $d$ in front of the hand lever C. When the finger and link are beyond the steering post, the free end of the link is drawn away from the free end of the finger to a position shown in dotted lines in Fig. 1, so that the finger will lay on one side of the pedals and the link on the other side of the pedals. The finger is moved in the direction of the pedals until the pedals are seated in the notches $e^3$, $e^4$ and $e^5$. The link $f$ is then moved toward the pedals, the notches $f^3$, $f^4$ and $f^5$ registering with the notches in finger $e$ and thereby rigidly engaging the pedals between the finger $e$ and link $f$. The shackle of a padlock is then passed thru the coinciding apertures $e'$ and $f'$ and the padlock snapped.

Lug $d$ is positioned on arm $c$ in a position such that when in the locked position as shown in Fig. 1, the emergency brake lever C is held in a neutral position, so that the vehicle may be moved by pushing it, so as to comply with the traffic laws of various cities. Should it be attempted to move the device by pushing on the low speed pedal D, this would operate the reverse pedal D' and the brake D². Moreover since the reverse pedal D' and the brake pedal D² are at a greater distance from the pivot point A than the low speed pedal D, the reverse pedal D' and the brake pedal D² would be thrown into operative position before the low speed pedal D. Therefore it would be impossible to move the car on its own power whilst the device is locked.

Having thus described my invention, what I claim is:—

1. In a pedal locking mechanism for automobiles and to be rigidly attached thereto, the combination of an angle bracket secured to the flooring, an angle link pivotally secured to said bracket, an arm pivotally connected to said angle link, pivotally mounted means carried by the arm for holding the pedals in non-operative positions, the arms and means carried thereby, being capable of assuming a contracted non-operative position upon the flooring and extending longitudinally of an automobile.

2. In a pedal and hand lever locking mechanism for automobiles and to be rigidly attached thereto, the combination of pedals, a hand lever, an angle bracket secured to the body, an arm, means for pivotally connecting said bracket and arm, a finger pivotally attached to said arm, a link pivotally attached to said finger, said finger and link when in a contracted or closed position being capable of holding in a non-operative position said pedals, a lug securely attached to said arm, said lug being capable of holding a hand lever in a non-operative position.

3. A locking mechanism for pedals and hand levers of automobiles and to be rigidly attached thereto, said mechanism comprising an angle bracket adapted to be secured to an automobile floor, an angle link, means carried by the angle link adapted to assume an operative position in engagement with the pedals and hand lever of an automobile, and a pivot connecting the angle bracket and angle link whereby the pedal and lever engaging means may be moved to an operative position and to an inoperative position in which said engaging means assumes a contracted form, lie at right angles to the floor intermediate the lever and the side of the automobile and be adjacent the side.

4. In a pedal and hand lever locking device for an automobile, the combination of a bracket, a seat on the bracket, an angle link pivotally attached to the bracket, an arm pivotally attached to the angle link, a lug attached to the arm and adapted to engage the hand lever, a finger pivotally attached to the arm, a link pivotally attached to the finger, seats formed upon the finger and link adapted to fixedly retain the pedals between the finger and link, the finger and link being adapted to be locked when the pedals are retained, and the seat on the bracket being adapted to receive the link and the finger.

5. A locking mechanism for pedals and hand levers of automobiles and to be rigidly attached thereto, said mechanism comprising an angle bracket adapted to be secured to an automobile floor, an angle link, means carried by the angle link adapted to assume an operative position in engagement with the pedals and hand lever of an automobile, and a pivot connecting the angle bracket and angle link whereby the pedal and lever engaging means may be moved to an operative position and to an inoperative position in which said engaging means assumes a contracted form, lie at right angles to the floor intermediate the lever and the side of the automobile and be adjacent the side, and means for holding said mechanism in an operative position.

In witness whereof, I have hereunto subscribed my name this 19 day of January, 1920.

FREDERICK M. ROSS.